United States Patent Office 3,419,467
Patented Dec. 31, 1968

3,419,467
METHOD OF AND APPARATUS FOR LOCATING ENVELOPE-TUBE DAMAGE AT INDIVIDUAL NUCLEAR FUEL ELEMENTS IN A REACTOR CORE
Rolf Holzer, Heinz Stehle, Franz Schubert, Robert Weber, and Erich Klar, Erlangen, Germany, assignors to Siemens Aktiengesellschaft, Erlangen, Germany
Filed Oct. 24, 1965, Ser. No. 504,943
Claims priority, application Germany, Mar. 31, 1965, S 96,296
8 Claims. (Cl. 176—19)

ABSTRACT OF THE DISCLOSURE

Method of locating envelope-tube damage of individual nuclear fuel elements in a reactor core includes coarsely checking respective multi-element regions of the core for occurrence of damage to thus detect any suspicious core region, individually and sequentially removing the fuel elements from the suspicious region and inserting them into a pressure vessel for testing the respective fuel elements, rinsing each element in the testing vessel with water and repeatedly changing pressure and temperature of the water in the testing vessel and measuring the concentration of fission products contained in the water. Apparatus for carrying out the above-mentioned method includes means for repeatedly changing the pressure and temperature of the water in the testing vessel.

---

Our invention relates to a method of locating envelope-tube damage at individual nulear fuel elements in a reactor core.

The methods heretofore known for this purpose required checking the reactivity of individual coolant channels or groups of such channels during reactor operation. This is possible because the occurrence of damage to fuel elements results in spontaneous issuance of volatile fission-produced isotopes into the coolant of the reactor. However, this phenomenon virtually ceases after shut-down of the reactor since only at the high operating temperatures do the fission products have a sufficient mobility to diffuse out of the nuclear fuel, particularly if the fuel is of the ceramic type. After shut-down, the discovery of damage to the fuel elements, that is as yet not optically discernible, is very difficult, especially after removal of the particular elements from the reactor core.

But even with nuclear reactors in which it is not possible to supervise individual fuel elements during operation, it is very difficult to pinpoint damaged fuel elements that cause contamination of the coolant by radioactive fission products.

It is an object of our invention to solve these problems in a relatively simple manner.

To this end, and in accordance with our invention, we proceed by first checking the reactor core, portion by portion, that is, successively in respective multi-element regions, as to occurrence of envelope-tube damage. This first checking is performed in a course manner not yet suitable to pinpoint individual elements, for example, by measuring the changes in activity occurring in the coolant circulation system when individual regulating rods of the reactor are being moved.

After one of the checked regions has been found to be suspicious, the fuel elements are individually removed from this region and displaced to a testing device in the storage space or cavity of the reactor. Each element then found to be undamaged is returned back from the storage cavity to its seat in the core region, and each element now found to be affected by envelope-tube damage is exchanged for a new fuel element.

In the testing device within the storage tank or cavity of the reactor, the fuel elements are individually subjected to washing or rinsing by repeated changing of water pressure and temperature, and the water is then checked in a separate vessel as to its content of fission products, especially tellurium and substances of its disintegration series (iodine, xenon). Such testing devices are preferably mounted within the element storage space of the reactor, because at this locality the necessary shielding conditions are automatically met.

The method of the invention will be further described with reference to the accompanying drawings, in which.

Figure 1:
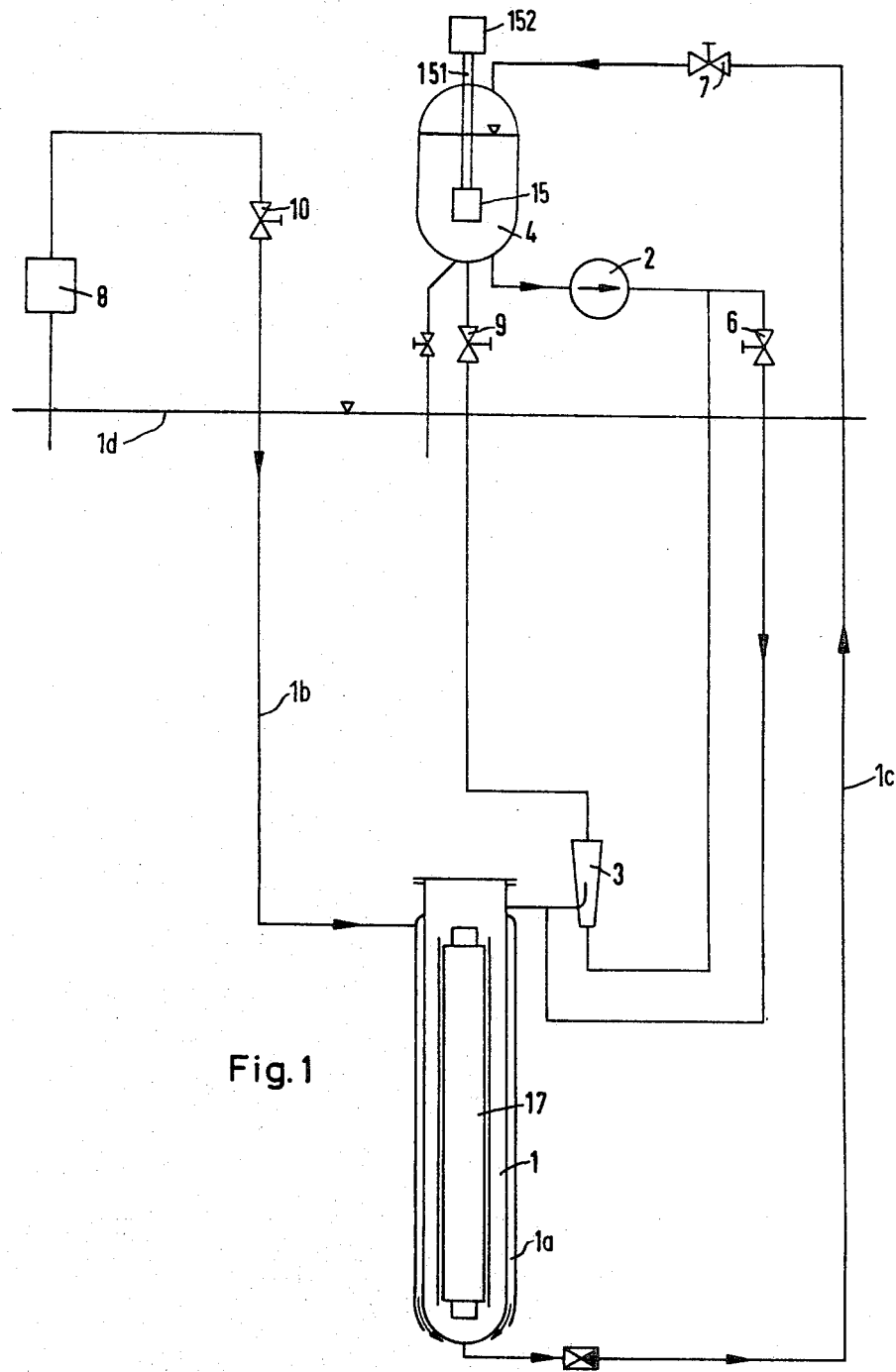
FIG. 1 shows schematically an example of a system with associated pump, filler device, filters and other accessories required for performing the method of the invention.

The devices shown in FIG. 1 are designed to check the fuel elements by washing suitable radioactive fission products out of the interior of a defective fuel rod and to then detect these fission products in the surrounding water. Sometimes the readily volatile fission products issuing during operation of the reactor, may already be lost when taking the fuel element out of the reactor core and inserting the element into a testing container. Nevertheless, there still remain fission products in the interior of the fuel element, which have issued from the fissionable material and accumulated at the inner side of the tubular envelope without having escaped to the outside. These accumulated radioactive fission products disintegrate, so that the method according to the invention is effective to rinse them out of the envelope through minute envelope fissures, if the tube exhibits such damage, thus making is possible to sense or measure the fission products from the outside. Notable among such fission products is tellurium with its dissociation products iodine and xenon. Of course, the accumulation of the tellurium isotope in the interior of the fuel rods occurs not only at the inner surface of the envelope tube, but also within the expansion space of the envelope structure, the holding springs and any other inserts with which the element may be equipped.

The equipment shown in FIG. 1 operates as follows:

The coolant circulating through the reactor core is being continuously supervised as to radioactivity. An increase in radioactivity is indicative of the fact that at least one fuel element has become defective and must be removed to prevent further contamination. For finding this particular element, its approximate locality must first be determined. For this purpose, individual regulating rods are displaced in the reactor core, one after the other, and any outbreak of fission products resulting during each such rod displacement is being observed. In this manner the various multi-element regions or portions of the reactor core are checked. If thus a region is found to be suspicious or defective, the fuel elements are individually taken out of this region, one after the other. This may be done, for example, with the aid of a conventional manipulating bridge and a fuel-element gripper. The removed individual fuel element is then inserted into a testing vessel 1. For shielding reasons, this vessel is located at the bottom of the fuel storage tank or the storage cavity within the surrounding shielding structure of the reactor plant, usually located immediately beneath the reactor core. After insertion of the fuel element 17, the vessel 1 is closed by a plug which, like the manipulator, is actuable from the outside.

The vessel 1 has a double cylindrical wall 1a to form a jacket to be traversed by water for cooling the vessel. Connected in the water supply line 1b is a cooling and filtering plant 8 which maintains the water in the storage cavity of the reactor at a uniform temperature and deactivates the water circulating from body of water below the level 1d through the filter 8 and the jacket 1a back into the surrounding water.

In the embodiment shown in FIG. 1, the interior of the testing vessel 1 is connected through a water line 1c with a measuring vessel 4 outside of the water contained in the storage cavity. The water content of the testing vessel 1 can be pumped into the measuring vessel 4 to maintain a circulation of the water quantity between the vessels 4 and 1 until an exchange of the respective water volumes has taken place. Valves 6, 7 and 9 afford controlling this circulation which is maintained by means of a pump 2, also securing the required pressure increase within the testing vessel 1. The pump 2, in conjunction with a water-jet pump 3 also affords obtaining a negative pressure in the testing vessel 1. Inserted into the measuring vessel 4 is a suitable measuring device 15 such as a scintillation counter.

For testing the fuel element 17 in vessel 1, the valve 10 is first closed, thus stopping the flow of coolant through the jacket space 1a. Now the temperature in the interior of testing vessel 1 increases since the after-disintegration heat of the fuel element 17 is no longer dissipated by a flow of coolant. Thereafter the valves 6, 7 and 9 are closed and the pump 2 is switched on. This places the testing vessel 1 under positive pressure. After a predetermined period of time, the valves 9 and 10 are opened so that the jacket space 1a of the testing vessel 1 is again cooled by a flow of water. The water-jet pump 3 is also placed in operation, thus producing a negative pressure in testing vessel 1.

If previously, on account of any leakage, water inclusions have been formed in the gap between the nuclear fuel proper and the envelope tube of the element 17, the application of negative pressure causes such water to rapidly evaporate and to subsequently expand into the surrounding water. Thereupon the valve 9 is again closed and the valves 6 and 7 are opened. The pump 2 now constrainedly transfers the water volume from testing vessel 1 into the measuring vessel 4. Then the pump 2 is switched off, and the activity in vessel 4 is measured with the aid of the scintillation counter 15.

Thereafter the cooling of the testing vessel 1 is again discontinued so that renewed heating of this vessel occurs, and simultaneously the testing vessel 1 is placed under positive pressure. This is followed by again passing a flow of coolant through the jacket space 1a and applying negative pressure with the aid of the water-jet pump 3, whereupon the valves are switched in the above-described manner to pass the content of testing vessel 1 to the measuring vessel 4. The activity is again measured, and the described process is repeated several times.

If the fuel element 17 in testing vessel 1 is defective, an increase in activity is noted after each step of circulation. When thus a damaged fuel element is recognized, this element is taken out of the testing vessel and lowered onto the bottom of the storage cavity, whereupon a new fuel element is substituted in the reactor core at the locality of the one previously removed and tested. If no damage has been found to exist at the fuel element tested, the same element is withdrawn from the testing vessel 1 and immediately returned into the reactor core.

The activity washed out of the defective fuel element 17 with the aid of the above-described device, is subsequently rinsed into the storage cavity from which it is eliminated through the appertaining circulatory system and in the filter equipment 8 by an ion exchanger or other devices known and used for such purposes.

Now the device is available for testing another fuel element, and the above-described operations are performed in the same sequence. It is preferable to control these operations by a program-switching or timing mechanism so that the measured values always remain comparable with each other.

Figure 2:
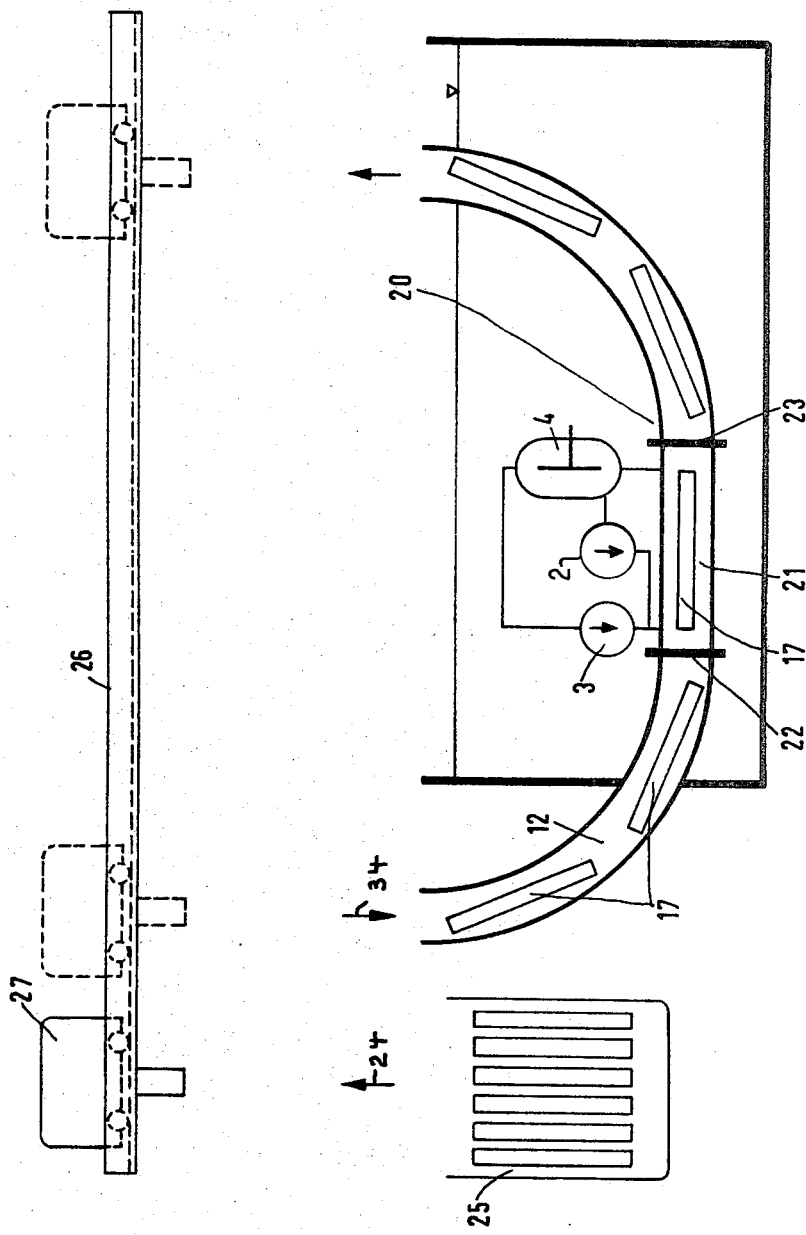
FIG. 2 shows schematically, partly in section and somewhat exploded, components of another system for performing the method according to the invention.

The method according to the invention may be performed by a variety of other devices, for example those exemplified in FIG. 2. According to this illustration, the fuel elements are taken from the reactor core 25 with the aid of an element gripper 27, this being indicated by an arrow 24. The gripper is then shifted along the manipulating bridge 26, and the withdrawn fuel element is inserted into a tubular conveyor system 12, this being indicated by an arrow 34. The conveyor passes the fuel elements 17 to the bottom of the storage cavity or vessel 20 here shown to form the bottom portion of a tank. Remotely controlled slide gates 22 and 23 permit dividing from the conveyor system 12 a chamber 21 which corresponds to the testing vessel 1 in FIG. 1, and which, accordingly, is in communication with a measuring vessel 4 and a water-jet pump 3, also with a pressure pump 2 and the water lines and valves, shown in FIG. 1 but for simplicity omitted in FIG. 2.

After testing the fuel element 17 in chamber 21, the gates 22 and 23 are opened and the fuel element is passed along in the tubular conveyor at whose other end it is again received by the element gripper 27 to be either set down into the storage tank or cavity or be transported back into the reactor core 25.

Which particular construction of the device for performing the method of the invention is to be chosen, depends upon the size and shape of the fuel elements to be checked, upon the amount of storage space available, and also upon the space available between the reactor core and the storage space.

It will be understood that the component devices, connecting conduits, valves and other auxiliaries shown in FIGS. 1 and 2 are represented only to the extent they are necessary and essential to the method according to the invention. As a rule, additional devices for measuring temperature, overpressure and safety valves, as well as devices for securing a constant water level in the measuring vessel 4, are required. However, since such auxiliaries throughout are conventional, it appears unnecessary to discuss them further in this specification.

Relative to the scintillation counter 15, it may be added that it is desirable to mount it in the testing vessel in such a manner that an optimal yield of the radiation quantums reaching the crystal of the counter is obtained, this being advisable on account of the small and relatively uncertain value of radioactivity in the water. As a rule, therefore, it is preferable to mount the scintillator at the center of the testing vessel, and to give this vessel and approximately spherical shape. With such an arrangement, the indicated gamma-flux may be approximately twice as large as if the counter is mounted at the edge of the vessel. Connected to the scintillation counter, if it is located at the center point of the measuring vessel, is an optical guide or light conductor 151 which extends through the wall of the testing vessel and is connected with a secondary-electron multiplier 152. This has the advantage that the photo-cathode of the electron multiplier may be kept at normal room temperature, thus preventing a temperature-dependent increase in thermal electron emission which essentially constituted the zero effect.

Figure 3:
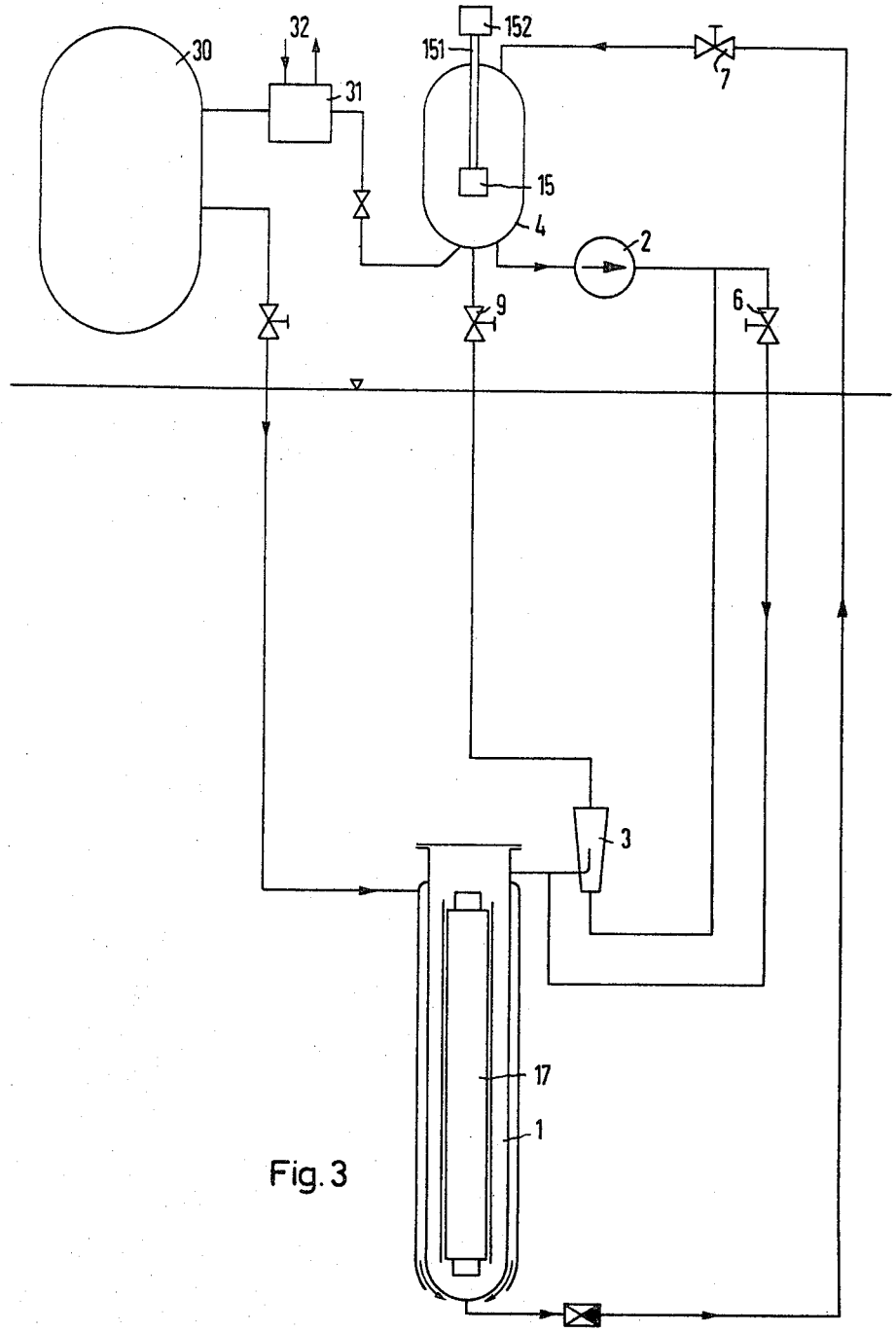
FIG. 3 shows schematically a slightly modified form of the system of FIG. 1.

According to another way of performing the method of the invention, the rinsed-out radioactivity is collected in the illustrated circulation of the rinsing liquid and is concentrated in this circulation system, for example, by insertion of an ion exchanger. This affords considerably increasing the detection probability at very slight liberated quantities of radioactivity. It will be understood, of course, that the rinsing circulation need not be operated with water but may also employ other fluids, for example, gases. This is sometimes particularly advantageous for fuel elelents used in a gas-cooled nuclear reactor. The corresponding equipment for thus applying the invention is shown in FIG. 3 and is analogous to that described above with regard to FIGS. 1 and 2, except that the rinsing gas is not released into the water cavity or tank but is returned into a gas-storage container 30. The concentration of the radioactivities issued into the rinsing medium can then be determined, for example, with the aid of a cooling trap 31 which is supplied with coolant through the conduits 32.

In view of the heat of subsequent disintegration generated in the fuel elements 17 being tested, and also on account of the gage pressure of about 10 atmospheres impressed by means of the pump 2, the water temperature in the testing vessel may rise up to about 180° C. During the testing period in which the water-jet pump and the cooling of testing vessel 1 are active, the gage pressure may be reduced to approximately ⅓ atmospheres. It is not at all detrimental if superficial boiling of the liquid takes place on the fuel element itself. Consequently, overheating of the fuel can be reliably prevented, since care is taken for good heat dissipation outside of the testing vessel 4. Of course, when testing fuel elements exhibiting slight liberation of subsequent disintegration heat, a separate heating of the surrounding water may be applied, for example, up to 250° C. During the subsequent pressure reduction, the water penetrated into the enveloping tube of the fuel element evaporates out, so that a good heat exchange is secured.

If desired, the testing method according to the invention may be performed continuously by providing for a sufficiently small testing vessel 1 and consequently also for sufficiently short temperature and pressure pulsations at the element being tested. Particularly in the case of such a continuous performance, it is advantageous to promote the removal of the radioactive fission products by application of sonic or ultrasonic vibrations.

The testing method according to the invention is not limited to nuclear reactors previously shut down, but may also be employed with all reactors that afford an exchange of fuel elements during operation. It is not limited to measuring or sensing the radiation issuing from tellurium, but may also be performed with the aid of sensors or gages responding to other fission products, depending upon the particular fissionable material of the fuel rods.

We claim:

1. Method of locating envelope-tube damage of individual nuclear fuel elements in a reactor core, which comprises coarsely checking respective multi-element regions of the core for occurrence of damage to thus detect any suspicious core region, individually and sequentially removing the fuel elements from said suspicious region and inserting them into a pressure vessel for testing the respective fuel elements, rinsing each element in the testing vessel with water and repeatedly changing pressure and temperature of the water in said testing vessel, and measuring the concentration of fission products contained in the water.

2. The method according to claim 1, which comprises moving individual regulator rods in said core and simultaneously measuring the resulting change in radioactivity within the coolant circulation of the reactor to thereby effect said coarse checking of said respective core regions.

3. The method according to claim 1, which comprises constrainedly recycling the rinsing water between the testing vessel and a measuring vessel, and effecting said measuring of said concentration within said measuring vessel.

4. Method according to claim 1, including measuring the content of tellurium and its disintegration products in the rinsing water when the reactor is shut off.

5. With a nuclear reactor having a core with fuel elements and having an element storage space which contains water, the combination of apparatus for locating envelope-tube damage of individual nuclear fuel elements, said apparatus comprising a pressure vessel located outside of the reactor core and sequentially accommodating individual fuel elements transferable thereto from a suspicious region of the reactor core for testing said fuel elements in said pressure vessel, a measuring vessel, a water circulatory system including said testing vessel and said measuring vessel and having circulation control means for transferring water from said testing vessel to said measuring vessel, means for rinsing each element in said testing vessel with the water, means for repeatedly changing the pressure and temperature of the water in said testing vessel, and radiation-responsive gage means in said measuring vessel for measuring the activity of the water transferred from said testing vessel as indicative of envelope-tube damage.

6. Apparatus according to claim 5, comprising a tubular conveyor device extending from said core to said storage space and having gate means for dividing an underwater chamber from said conveyor device, said chamber forming said testing vessel.

7. An apparatus according to claim 5, said measuring vessel and said circulatory system being mounted below the water level of said storage space.

8. Apparatus according to claim 5, wherein said testing vessel is located outside of said storage space.

References Cited

UNITED STATES PATENTS

| 2,846,872 | 8/1958 | McAdams et al. | 73—45.5 |
| 3,073,767 | 1/1963 | Whitham et al. | 176—19 X |
| 3,142,625 | 7/1964 | Wellborn | 176—32 |

FOREIGN PATENTS

| 1,328,935 | 4/1963 | France. |

OTHER REFERENCES

Kelly: Burst Slug Detection in Water-Cooled Reactors July, 1959, of Nuclear Power, pp. 77–79.

Osborne: Locating Failed Fuel in Water Reactors, July 1961, of Nucleonics, pp. 84, 86, 89.

REUBEN EPSTEIN, *Primary Examiner.*

U.S. Cl. X.R.

23—45.5